United States Patent
De'Longhi et al.

(10) Patent No.: US 11,470,993 B2
(45) Date of Patent: Oct. 18, 2022

(54) COFFEE MACHINE WITH IMPROVED MOVEMENT SYSTEM OF THE BREWING CYLINDER

(71) Applicant: De'Longhi Appliances S.R.L., Treviso (IT)

(72) Inventors: Giuseppe De'Longhi, Treviso (IT); Paolo Evangelisti, Bologna (IT); Floriano Franzon, Vazzola (IT)

(73) Assignee: De'Longhi Appliances S.R.L., Treviso (IT)

( * ) Notice: Subject to any disclaimer, the term of this patent is extended or adjusted under 35 U.S.C. 154(b) by 875 days.

(21) Appl. No.: 16/337,172

(22) PCT Filed: Sep. 26, 2017

(86) PCT No.: PCT/EP2017/074415
§ 371 (c)(1),
(2) Date: Mar. 27, 2019

(87) PCT Pub. No.: WO2018/060211
PCT Pub. Date: Apr. 5, 2018

(65) Prior Publication Data
US 2021/0369040 A1    Dec. 2, 2021

(30) Foreign Application Priority Data

Sep. 27, 2016  (IT) .................. 102016000096912

(51) Int. Cl.
*A47J 31/36*  (2006.01)
(52) U.S. Cl.
CPC ............................. *A47J 31/3614* (2013.01)

(58) Field of Classification Search
CPC ................ A47J 31/3614; A47J 31/3604; A47J 31/3609; B21D 22/21
USPC ....................................................... 219/289 R
See application file for complete search history.

(56) References Cited

U.S. PATENT DOCUMENTS 5,865,096 A * 2/1999 Kawabata .............. A47J 31/36
99/302 R
2008/0264266 A1* 10/2008 Carbonini .......... A47J 31/3609
99/289 R

FOREIGN PATENT DOCUMENTS

| EP | 2036466 A1 | 3/2009 |
| EP | 2764804 A1 | 8/2014 |
| EP | 2907427 A1 | 8/2015 |
| WO | 2013098096 A1 | 7/2013 |

OTHER PUBLICATIONS

International Search Report dated Dec. 13, 2017; International Application No. PCT/EP2017/074415; International Filing Date: Sep. 26, 2017; 3 pages.
Written Opinion dated Dec. 13, 2017; International Application No. PCT/EP2017/074415; International Filing Date: Sep. 26, 2017; 4 pages.

* cited by examiner

*Primary Examiner* — Dana Ross
*Assistant Examiner* — James F Sims, III
(74) *Attorney, Agent, or Firm* — Blank Rome LLP

(57) ABSTRACT

The coffee machine (1) comprises a brewing cylinder (2), a movement system of the brewing cylinder (2) comprising a nut screw (8) engaged with a motorised screw (9), and elastic means (13) compensating the mechanical backlash between the threads of the screw (9) and of the nut screw (8).

12 Claims, 6 Drawing Sheets

COFFEE MACHINE WITH IMPROVED MOVEMENT SYSTEM OF THE BREWING CYLINDER

RELATED APPLICATIONS

This application is a U.S. national phase application of International Application No. PCT/EP2017/074415, filed Sep. 26, 2017; which application claims benefit of priority of Italy Application No. 102016000096912, filed Sep. 27, 2016. Each of the above-identified related applications are incorporated by reference.

FIELD OF USE

The present invention relates to a coffee machine comprising a brewing cylinder that is subjectable to reversible displacement from a disengagement position to an engagement position with a closing piston to create a brewing chamber in which the hot brewing water is conveyed that comes from a suitable boiler.

BACKGROUND OF THE INVENTION

The movement of the brewing cylinder can be translational or rototranslational and uses a movement system that in many cases comprises a nut screw engaged and guided to translate along a screw.

The brewing cylinder is supported by a support in turn supported by the nut screw that is driven by the suitably motorised screw.

In current movement systems of the brewing cylinder, as the members of which the brewing cylinder is composed can have mechanical backlash, they are subject to rapid wear and to noise emissions that in addition to being annoying can be perceived by the user as a sign of a malfunction of the coffee machine.

SUMMARY OF THE INVENTION

The technical task that this invention proposes is thus to provide a coffee machine that enables the technical drawbacks complained of in the prior art to be eliminated.

Within the scope of this technical task, an aim of the invention is to provide a coffee machine that limits wear to the members of the movement system of the brewing cylinder, thus extending the life cycle thereof.

Another object of the invention is to provide a coffee machine capable to operate in a very silent manner.

Another object of the invention is to provide a coffee machine that ensures a reduction of routine maintenance.

The technical task, as well as these and other aims, according to the present invention are achieved by a coffee machine comprising a brewing cylinder and a movement system of said brewing cylinder comprising a nut screw engaged with a motorised screw, characterised in that it has elastic means compensating the mechanical backlash present between the threads of said screw and said nut screw.

The movement system of the brewing cylinder preferably comprises a support of the brewing cylinder, said nut screw supporting said support of the brewing cylinder, said motorised screw, and a translation guide of said nut screw along said screw.

In a preferred embodiment of the invention, said elastic means comprises an auxiliary nut screw engaged with said screw and guided in translation along said screw, and at least one tensioned elastic element connecting said nut screw supporting said support and said auxiliary nut screw. The presence of the compensating elastic means ensures the maintenance of a contact force between the sides of the threads of the screw and of the nut screw supporting said support during movement of the brewing cylinder.

In this manner, during movement of the brewing cylinder the occurrence of mechanical backlash between the members of the movement system is avoided and vibrations and the emission of audible noises are thus eliminated.

The compensation of the mechanical backlash by elastic means enables the service life of the coffee machine to be extended, or, higher performance standards over the same length of service life to be ensured.

BRIEF DESCRIPTION OF THE DRAWINGS

Further characteristics and advantages of the invention will be more evident from the description of a preferred but not exclusive embodiment of the brewing unit according to the invention, illustrated by way of indicative, non-limiting example in the accompanying drawings, in which.

DETAILED DESCRIPTION OF THE ILLUSTRATED EMBODIMENTS

Figure 1:
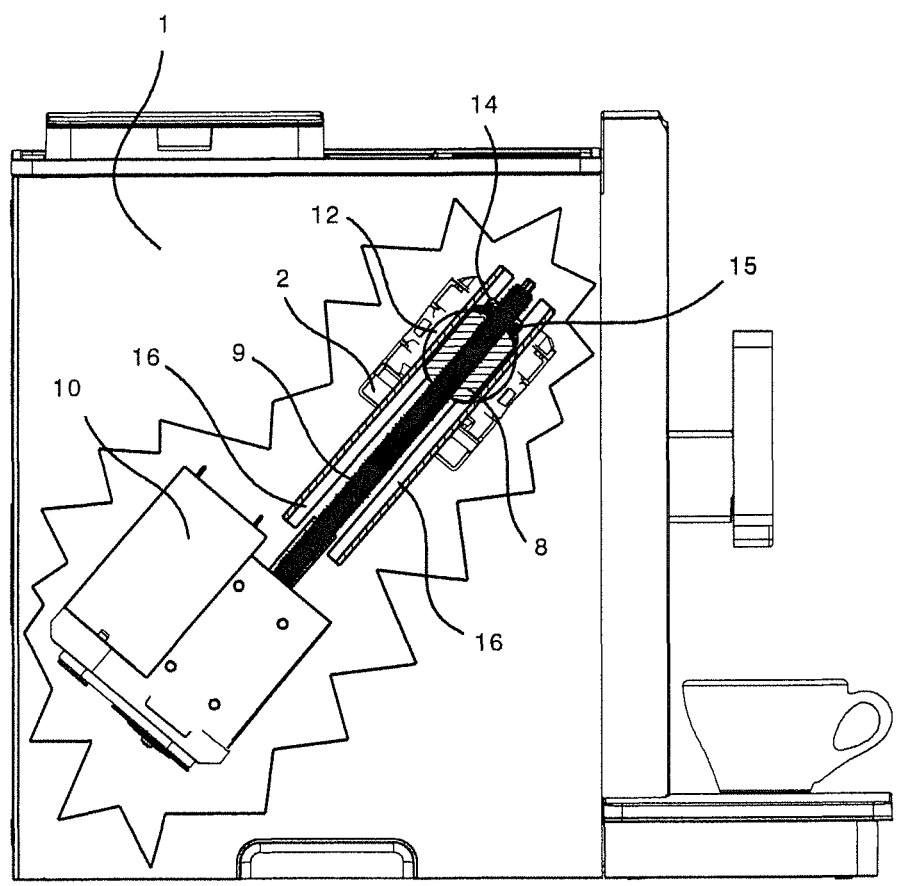
FIG. 1 shows a side raised schematic view of a coffee machine showing the brewing unit conforming to a first embodiment of the invention.
Figure 2:
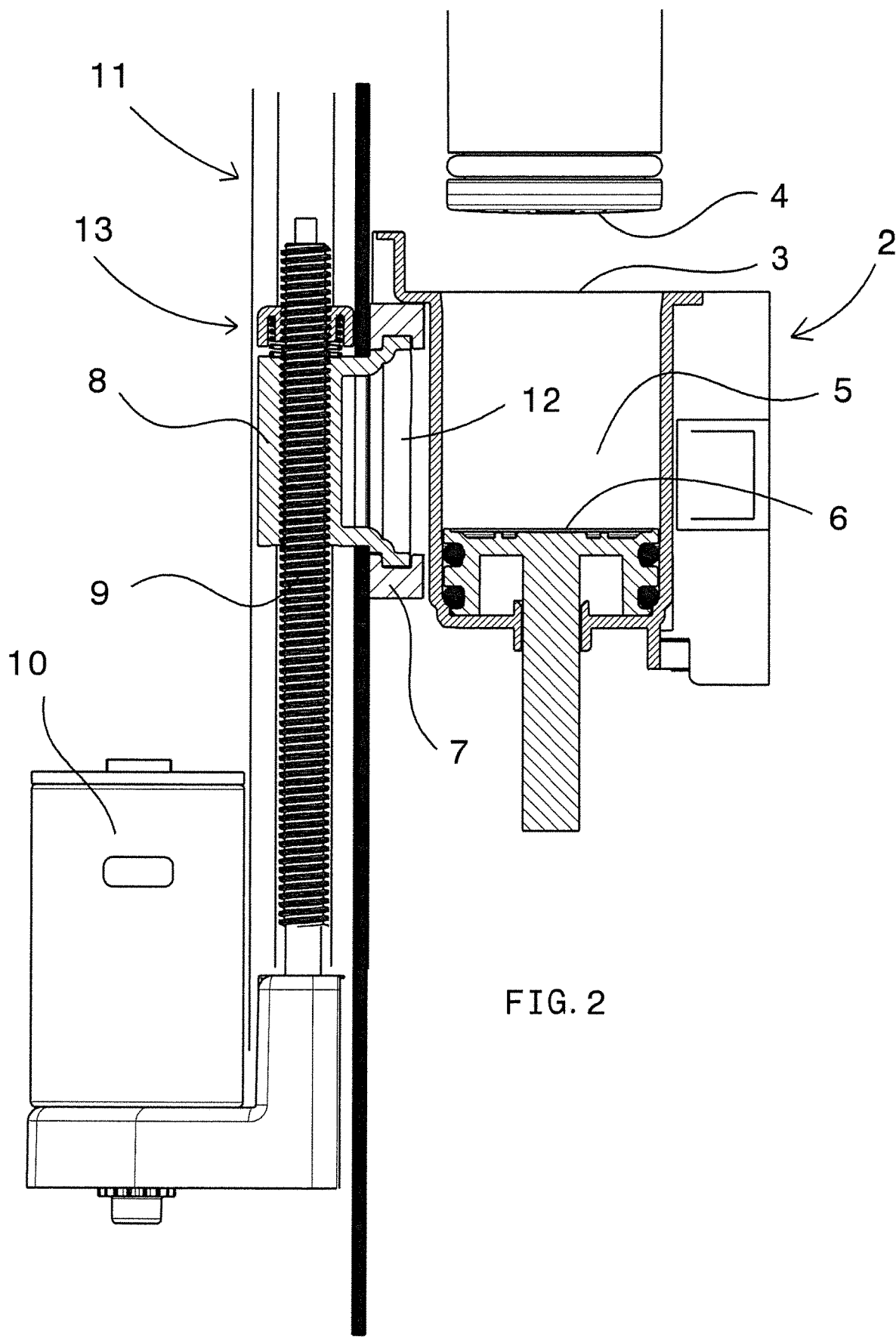
FIG. 2 shows a front sectional view of the movement system of the brewing cylinder of the coffee machine in FIG. 1.
Figure 3:
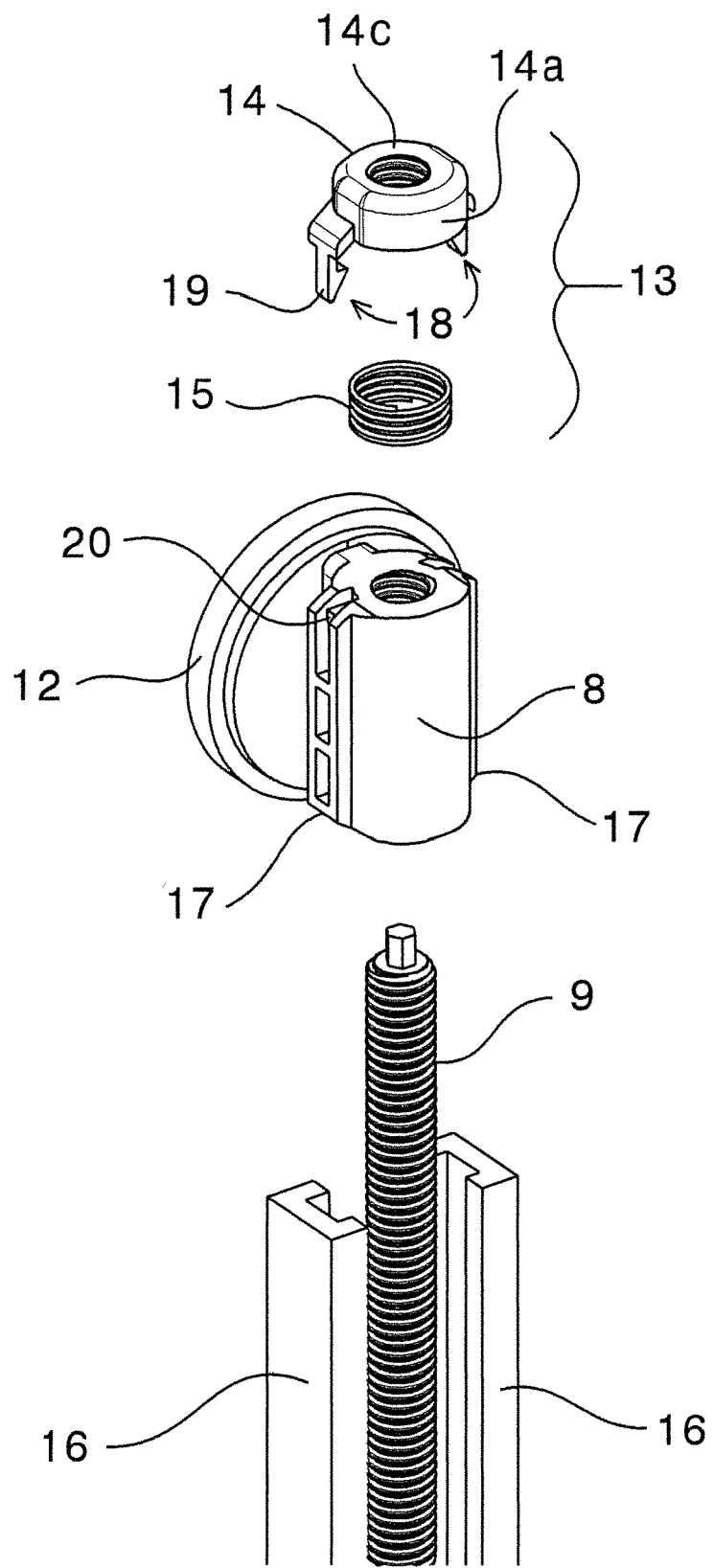
FIG. 3 shows an exploded axonometric view of certain components of the movement system of the brewing cylinder of the coffee machine of FIG. 1.
Figure 4:
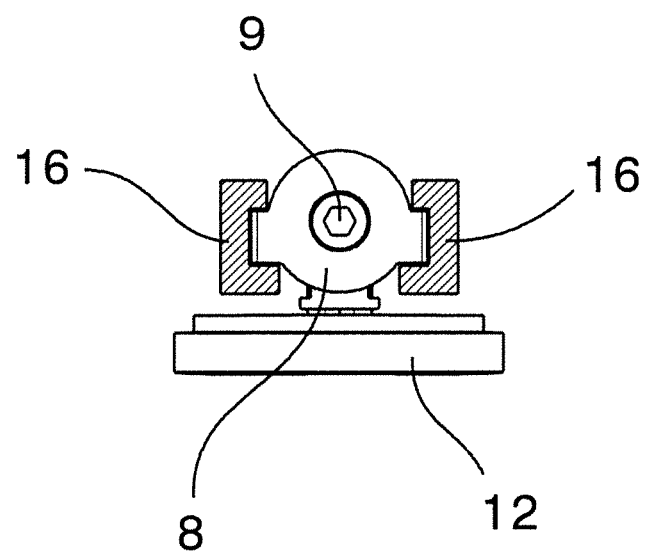
FIG. 4 shows a plan view of the components in FIG. 3 in an assembled configuration.
Figure 5:
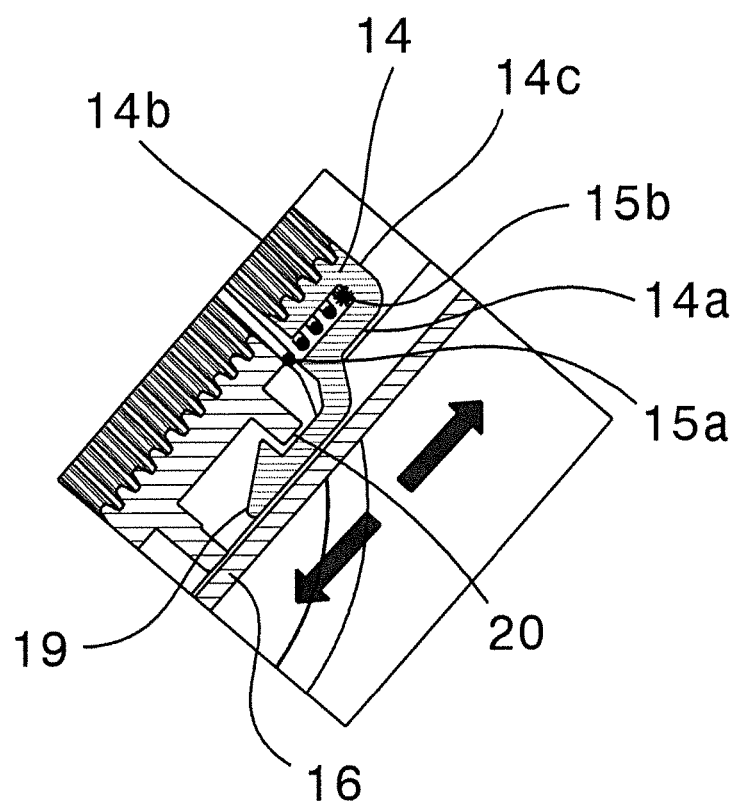
FIG. 5 shows a sectional view of an enlarged detail of certain components of the movement system of the brewing cylinder.

Equivalent parts in the two embodiments of the invention will be denoted by the same reference number.

With reference to the mentioned figures, a coffee machine 1 is illustrated that has a brewing unit comprising a hollow brewing cylinder 2 having an access mouth 3 engageable by a closing piston 4 for delimiting a brewing chamber 5 in which a load of coffee is positionable.

The brewing cylinder 2 is subjectable to a reversible rototranslational stroke between a coffee load loading position, in which it is disengaged from the closing piston 4 and has the axis tilted to the axis of the closing piston 4, and a brewing position in which it is sealingly engaged with the closing piston 4 and has the axis in the direction of the axis of the closing piston 4.

Inside the brewing cylinder 2 there is an ejection piston 6 that is slidable in the direction of the axis of the brewing cylinder 2 between a retracted position and an extended position for ejecting the load of spent coffee grounds.

The ejection piston 6 can be driven in a known manner by suitable, not shown cams.

The brewing cylinder 2 is fixed, preferably but not necessarily in a removable manner, to a support 7 that is translatable in the direction of the axis of the closing piston 4.

The support 7 is supported by a nut screw 8 engaged with a constant pitch screw 9 oriented in the direction of the axis of the closing piston 4 and rotatingly movable on itself by a suitable geared motor 10.

The nut screw 8 is constrained to a translation guide 11 that prevents rotation thereof on itself when it is driven by the screw 9.

The translation guide 11 of the nut screw 8 is formed by two "C"-shaped profiles 16 that are fixed to the frame of the coffee machine 1 in which wings 17 diametrically opposite the supporting nut screw 8 are guided to slide.

The nut screw 8 also has a pin 12 for supporting the support 7 in an oscillatable manner with an oscillation axis oriented in a direction that is orthogonal to the translation direction thereof.

In order to perform the oscillation, the support 7 interferes in a known manner with suitable cams that are not shown.

The brewing unit operates as follows.

The brewing cylinder 2 is at the start of the stroke with the axis in a vertical direction or a little tilted with respect to the vertical direction. The ejection piston 6 is in a retracted position in the brewing chamber 5.

At the end of loading of the coffee powder in the brewing cylinder 2, the geared motor 10 rotates the screw 9 that translates upwards the nut screw 8 and consequently the support 7 supported by the nut screw 8 and the brewing cylinder 2 supported by the support 7.

During the initial upward dragging part, the support 7 oscillates until it orientates the brewing cylinder 2 with an axis aligned on the axis of the closing piston 4.

In the subsequent upward movement, the brewing cylinder 2 maintains the same angular orientation and thus engages with the closing piston 4.

The brewing cylinder 2 stops in this position with the ejection piston 6 still in the retracted position.

For brewing, the closing piston 4 is supplied with a flow of water that is specially heated in a suitable boiler (not shown). The hot brewing water is injected into the brewing chamber and the resulting brewed beverage is extracted through a suitable outlet port provided in the brewing cylinder 2.

At the end of the brewing, the descent movement of the brewing cylinder 2 starts, which is made possible by the reversal of the movement transmitted by the geared motor 10.

The descent of the brewing cylinder 2 concludes with an oscillation contrary to the initial oscillation with which it returns to the position of loading a new load of coffee.

During oscillation of the brewing cylinder 2, the ejection piston 6 is dragged to the retraction position.

The novel aspect of the coffee machine 1 relates to the specific provision of elastic means 13 compensating the mechanical backlash between the threads of the screw 9 and of the nut screw 8 supporting the support 7.

The compensating elastic means 13 comprises an auxiliary nut screw 14 engaged with the screw 9 and guided in translation along the screw 9 itself, and at least one tensioned elastic element 15 connecting the nut screw 8 supporting the support 7 and the auxiliary nut screw 14.

The compensating elastic element 15 consists of an axial element having an end 15a engaging with the supporting nut screw 8 and an end 15b engaging with the auxiliary nut screw 14.

In the solutions shown in FIGS. 1-7 the elastic element 15 is compressed between the supporting nut screw 8 and the auxiliary nut screw 14.

The elastic element 15 consists in particular of a helical spring having one end resting against the supporting nut screw 8 and the other end resting against the auxiliary nut screw 14.

In one solution that is not shown, the elastic element 15 is a tensioned helical spring having one end fixed to the supporting nut screw 8 and the other end fixed to the auxiliary nut screw 14.

Reference is now made to the solution shown in FIGS. 1-5 where the auxiliary nut screw 14 is positioned above the supporting nut screw 8.

The auxiliary nut screw 14 has a first cylindrical tube-shaped element 14a, a second cylindrical tube-shaped element 14b that is coaxial with and inside the first element 14a, and a base 14c that supports on the same side the first and the second elements 4a, 14b.

The second element 14b internally has a thread by means of which the supporting nut screw 8 engages with the screw 8.

The second element 14b delimits with the first element 14a a gap in which the helical spring is positioned that thus remains housed between the gap and the upper end of the supporting nut screw 8.

The base 14c of the auxiliary nut screw 14 is further open centrally for the passage of the screw 9.

The auxiliary nut screw 14 has lastly one or more hooking members 18 for hooking to the supporting nut screw 8.

The hooking members 18 are shaped as elastically yieldable teeth that are snap-fittable in suitable hooking seatings 20 provided in the supporting nut screw 8 and more precisely in the wings 17 thereof.

The hooking members 19 are supported externally on the first element 14a and extend on the extension of the cylindrical generators of the latter on the side opposite the base 14c.

In order to assemble the compensating elastic means 13, the supporting nut screw 8 is first tightened on the screw 9, then the helical spring is fitted on the screw 9 and lastly the auxiliary nut screw 14 is tightened on the screw 9.

The auxiliary nut screw 14, whilst it is being tightened on the screw 9, gradually compresses the helical spring against the supporting nut screw 8 until the hooking members 19 are taken to the hooking seatings 20.

As they have the same pitch as the screw 9 with which they are engaged, the supporting nut screw 8 and the auxiliary nut screw 14 are integral with one another in translation along the screw 9 net of any mechanical backlash between the threads thereof and the threads of the screw 9.

For this reason, also the degree of compression of the helical spring remains unvaried.

Advantageously, during the movement of the brewing cylinder 2, the compressed helical spring constantly maintains a contact force between the threads of the supporting nut screw 8 and the threads of the screw 9.

In particular, on one side, the helical spring keeps the threads of the auxiliary nut screw 14 pressed against the threads of the screw 9 and on the other side keeps the threads of the supporting nut screw 8 against the threads of the screw 9.

The movement of the members of the movement system is thus regular and overall operation is completely silent.

Reference is now made to the solution shown in FIGS. 6 and 7, where the auxiliary nut screw 14 is positioned below the supporting nut screw 8.

The supporting nut screw 8 has in this case at the bottom an anti-rotation guide (not shown) in which suitable diametric wings 140 of the auxiliary nut screw 14 are engaged that is thus constrained integrally in translation to the supporting nut screw 8.

Above the supporting nut screw 8, a protective element against dust 141 is hooked.

In this constructional variant, the supporting nut screw 8 normally rests with the upper side of the thread thereof against the lower side of the thread of the screw 9.

In the descent step of the brewing unit, the friction forces acting on the supporting nut screw 8 are the same as to the elastic force generated by the elastic element 15, so that the support rest is maintained between the upper side of the thread of the supporting nut screw 8 and the lower side of the thread of the screw 9.

In the descent step of the brewing unit, also the movement forces of the ejection piston 6, which are generated by suitable cams that are not shown, are the same as the elastic force generated by the elastic element 15, and in particular both the extraction force necessary for unloading the spent coffee grounds from the brewing chamber, and the retraction force necessary for returning the brewing chamber to a suitable configuration for receiving a new load of coffee.

In the solution illustrated in FIGS. 1-5 on the other hand such extraction and retraction forces of the ejection piston 6 are contrary to the elastic force generated by the elastic element 15, which accordingly has to have a greater elastic constant.

Figures 6, 7:
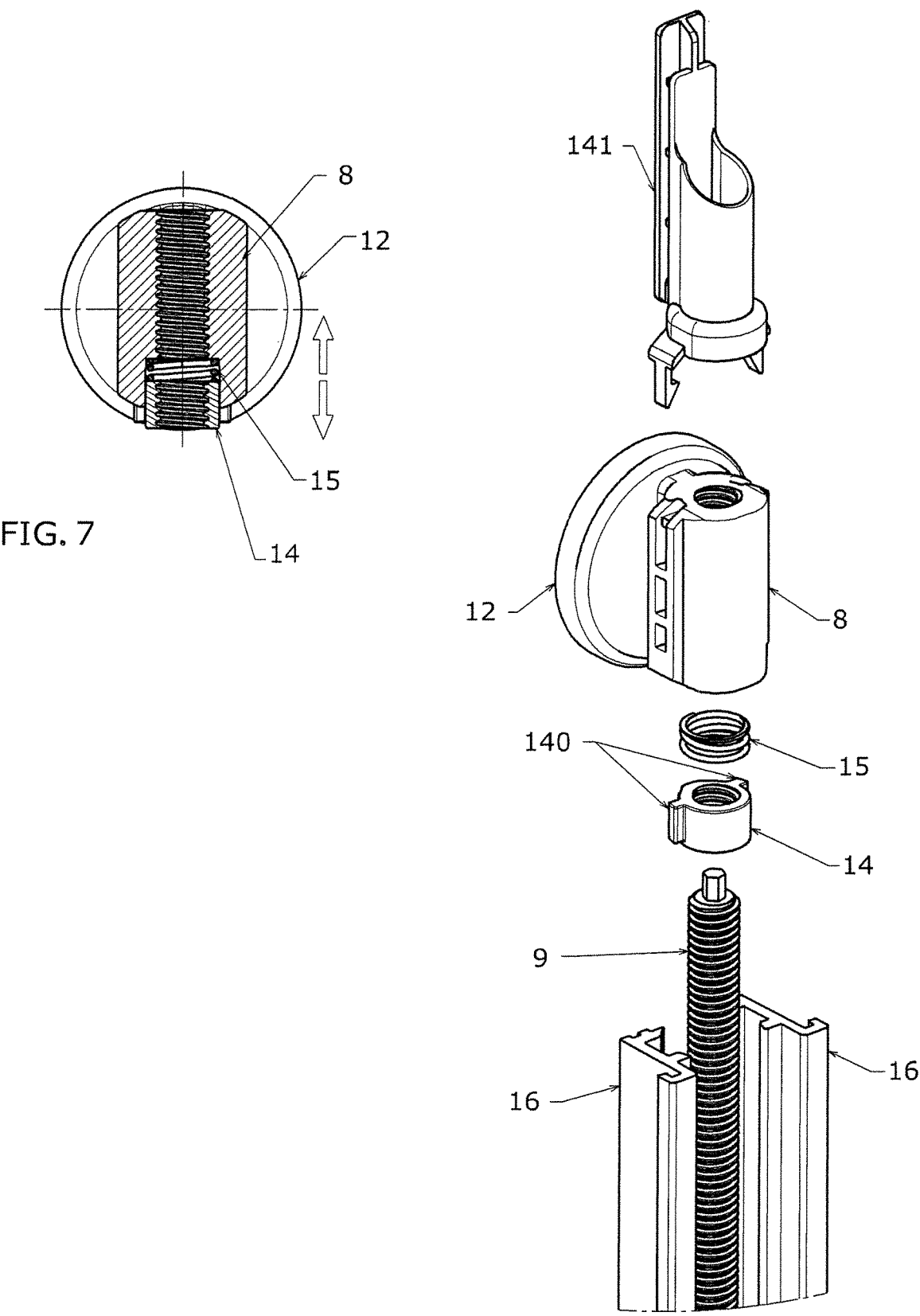
FIG. 6 shows an exploded view of a constructional variant on the movement system of the brewing cylinder.
FIG. 7 shows an axial section detail of the movement system in FIG. 6.

Another advantage of the constructional variant illustrated in FIGS. 6, 7 is related to the fact that when the brewing unit reaches the brewing configuration in which the brewing cylinder 2 is engaged with the closing piston 4, the elastic force exerted by the elastic element 15 is overcome by the force exerted in the opposite direction by the closing piston 4 on the brewing cylinder 2. Accordingly, in the brewing configuration, the lower side of the thread of the supporting nut screw 8 rests against the lower side of the thread of the screw 9. In practice, in this configuration of the brewing unit, where there are great forces at play that could damage the thread of the supporting nut screw 8, the integrity is preserved completely of the upper side of the thread of the supporting nut screw 8 operating during movement of the brewing unit.

The coffee machine as conceived herein is susceptible to many modifications and variations, all falling within the scope of the inventive concept; furthermore, all the details are replaceable by technically equivalent elements.

Lastly, the materials used, as well as the dimensions, can be any according to the needs and the state of the art.

The invention claimed is:

1. A coffee machine (1) comprising:
a brewing cylinder (2); and
a movement system of said brewing cylinder (2) comprising:
 a nut screw (8);
 a motorized screw (9), where the nut screw (8) is configured for engagement with, and translation along, the motorized screw (9);
 a support (7) of the brewing cylinder (2) that attaches the brewing cylinder (2) to the nut screw (8), where said nut screw (8) carries said support (7) of the brewing cylinder (2); and
 an elastic system (13) comprising:

an auxiliary nut screw (14) configured for engagement with said motorized screw (9) and guided in translation along said motorized screw (9); and
 an elastic element (15) in tension between and engaging said nut screw (8) and said auxiliary nut screw (14), whereby said elastic system (13) provides for compensation of mechanical backlash between threads of said motorized screw (9) and said nut screw (8).

2. The coffee machine (1) according to claim 1, wherein said movement system of the brewing cylinder (2) further comprises a translation guide (11) of said nut screw (8) along said motorized screw (9).

3. The coffee machine (1) according to claim 1, wherein said elastic element (15) comprises an axial element having an end engaging said nut screw (8) and an end engaging with said auxiliary nut screw (14).

4. The coffee machine (1) according to claim 3, wherein said axial element comprises a helical spring.

5. The coffee machine (1) according to claim 1, wherein said nut screw (8) has a support pin (12) in rotation of said support (7) of the brewing cylinder (2).

6. The coffee machine (1) according to claim 1, wherein said auxiliary nut screw (14) is positioned upstream of said nut screw (8) with reference to an advancement direction of said brewing cylinder (2) towards a closing piston (4) of said brewing cylinder (4).

7. The coffee machine (1) according to claim 1, wherein said auxiliary nut screw (14) is positioned downstream of said nut screw (8) with reference to an advancement direction of said brewing cylinder (2) towards a closing piston (4) of said brewing cylinder (4).

8. The coffee machine (1) according to claim 1, wherein said auxiliary nut screw (14) has one or more hooking members (19) to said nut screw (8).

9. The coffee machine (1) according to claim 8, wherein said hooking members (19) are conformed as hooking teeth engaged in suitable hooking seatings (20) afforded in said nut screw (8).

10. The coffee machine (1) according to claim 8, wherein said hooking members (19) are elastically yielding for a snap-fit hooking in said hooking seatings (20).

11. A coffee machine (1) comprising:
a brewing cylinder (2); and
a movement system of said brewing cylinder (2) comprising:
 a nut screw (8);
 a motorized screw (9), where the nut screw (8) is configured for engagement with, and translation along, the motorized screw (9); and
 a support (7) of the brewing cylinder (2) that attaches the brewing cylinder (2) to the nut screw (8), where said nut screw (8) carries said support (7) of the brewing cylinder (2);
 wherein said nut screw (8) has a support pin (12) in rotation of said support (7) of the brewing cylinder (2).

12. The coffee machine (1) according to claim 11, wherein said support pin (12) provides rotation of said support (7) of the brewing cylinder (2) in an oscillatable manner with an oscillation axis oriented in a direction orthogonal to a translation direction of said support (7) of the brewing cylinder (2).

* * * * *